United States Patent Office 2,872,328
Patented Feb. 3, 1959

2,872,328

FIRED TRICALCIUM BONDED SILICA BRICK AND MORTAR

Howard F. West and John H. Veale, Joliet, Ill., assignors to Illinois Clay Products Company, Joliet, Ill., a corporation of Illinois No Drawing. Application July 12, 1955
Serial No. 521,614

2 Claims. (Cl. 106—63)

This invention relates to a fired silica brick and to a method of making it. A closely associated invention relates to an unfired silica brick. The unfired brick is described in concurrently filed patent application Serial No. 521,613, filed July 12, 1955, entitled "Unfired Calcium Sulphate-Calcium Phosphate Bonded Silica Brick."

The object of this invention is to produce a silica brick principally from ganister as mined which will withstand furnace temperatures of 3100° F. The standard silica brick on the market made from ganister as mined, and therefore, containing up to one percent of alumina, will withstand temperatures up to approximately 3000° F. The bond is calcium silicate. A "super-duty" silica brick now on the market has about three-fourths of the alumina removed from the ganister, and contains therefore .25 percent or less of alumina. This brick will withstand temperatures up to approximately 3060° F. The alumina forms a rather low eutectic with calcium silicate and this is responsible for the standard silica bricks' being limited to furnaces operating at temperatures of 3000° F. or less.

The objects of this invention are primarily, to provide a bonded substantially exclusively by tricalcium phosphate, silica brick, and secondarily, to provide a method of making such a brick. The difficulties are in the method and arise from two facts. Firstly, the tricalcium phosphate bond must be formed in situ amongst particles of silica and ganister and hence the compounds from which the tricalcium is to be formed must be in the original mix before pressing into bricks. Inasmuch as the silica is present in 90–98% of the mix, some means must be devised to prevent the formation of calcium silicate, $CaSiO_3$. Secondly, tricalcium phosphate is difficult to compound, not commencing to form until temperatures well over 2000° F.

The feature of applicants' tricalcium phosphate bonded silica brick is a composition composed of granular ganister with the alumina bearing the same relationship to the silica as it did in the ganister as mined, and with the granular ganister and pure silica bonded by tricalcium phosphate with a small percentage of dicalcium pyrophosphate, and substantially no calcium silicate.

The feature of applicants' method is the use of concentrated sulphuric acid in the original mix to tie up the calcium and prevent its association with silica.

A specific example of the process and final brick will first be presented.

Example

Ganister is combined in the usual manner of making silica brick. One analysis is:

Ganister 10%, —¼, +¹⁄₁₆ mesh
Ganister 75%, —⅛, +200 mesh
Silica flour 15%, —200 mesh This mixture consists of about 99% silica, $SiO_2$, and 1% alumina, $Al_2O_3$.

To 100 parts of the combined ganister having the composition shown above is first added and mixed 3 parts by weight of 98% sulphuric acid, $H_2SO_4$. To this mixture is then added in any order 2¼ parts by weight (of the ganister alone) of mono-basic calcium phosphate, $Ca(H_2PO_4)_2$, and 1⅛ parts by weight (of the ganister alone) of powdered calcium hydroxide, $Ca(OH)_2$. All ingredients are at room temperatures and the mixing is done at room temperatures.

The composition after thorough mixing is tacky. It is pressed into bricks at a pressure of about 4,000 pounds, and dried at temperatures up to 700° F. for twelve hours.

The bricks are then moved to a firing kiln and the temperature held at 2400°–2700° F. for 36 hours. After removing from the kiln and cooling, the bricks were found to have a modulus of rupture of 800 p. s. i. and a density of 1 oz. per cu. inch. When this brick was placed under a greater load than it would be required to sustain at any point in the roof of an open hearth furnace, namely, 25 p. s. i., it successfully withstood temperatures of 3120° F. Its success was in no way dependent upon how rapidly or slowly or irregularly its temperature was raised.

Its analysis was as follows: 96.5% silica intimately mixed with about .8% of alumina with 2.7% of tricalcium phosphate bonds. The silica was principally in tridymite and cristobalite crystalline forms. There were traces of dicalcium phosphate. There were no traces of calcium silicate.

Applicants submit the following formula and equations as a possible explanation of what takes place from the time of mixing to the final phosphate bonded brick in the furnace roof or wall, silica not entering into the reaction, or at least entering into the reaction only to a very minor extent. Silica and alumina are omitted from the equations, as well as any other impurities which may be present in amounts of fractions of one percent of the total weight of the ganister. Starting with calcium phosphate, calcium hydroxide and sulphuric acid, the reactions are as follows:

After mixing, the bond becomes:

$$3Ca(H_2PO_4)_2 + 5Ca(OH)_2 + 10H_2SO_4 \rightarrow 3Ca(H_2PO_4)_2 + 5Ca(HSO_4)_2 \cdot 10H_2O$$

After drying at 700° F., the bond then becomes:

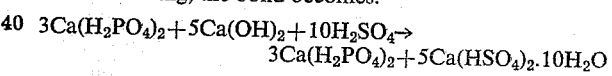

$$3Ca(H_2PO_4)_2 \cdot 5Ca(HSO_4)_2 \cdot 10H_2O \xrightarrow{\Delta} 2CaSO_4 + 6CaHPO_4 + 8H_2SO_4 + 10H_2O$$

After heating to 1500° F., the bond then becomes:

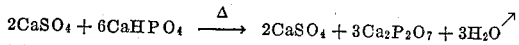

$$2CaSO_4 + 6CaHPO_4 \xrightarrow{\Delta} 2CaSO_4 + 3Ca_2P_2O_7 + 3H_2O$$

After heating to 2300° F., the bond then becomes:

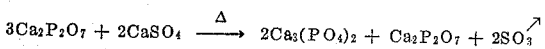

$$3Ca_2P_2O_7 + 2CaSO_4 \xrightarrow{\Delta} 2Ca_3(PO_4)_2 + Ca_2P_2O_7 + 2SO_3$$

The crux of this invention resides in the function of the sulphuric acid and its sulphur derivatives formed during heating. Initially, sufficient phosphoric acid (or other phosphorous compound) and sulphuric acid are used to convert all of the lime (or calcium hydroxide) into calcium sulphate and calcium phosphate. No free calcium or lime is left in the mix to combine with the silica when the temperature reaches the point where calcium silicates might commence to form.

The quantity of sulphuric acid to the quantity of phosphoric acid (or equivalent) is such that there will be sufficient calcium in the calcium sulphate to unite with the dibasic calcium phosphate to form tricalcium phosphate with little excess of calcium. Excess calcium or lime would unite with the silica.

The calcium sulphate and di-basic calcium phosphate have crystalline forms so similar to each other that X-ray analysis is unable to separate them as shown in "Composition and Properties of Superphosphates," Hill et al., Ind.

Engr. Chem., 28, p. 440 (1936). It is inferred consequently that these two compounds are dispersed randomly amongst each other and that when the temperature is reached at which calcium sulphate breaks down, sulphur trioxide passing off as a gas, the remaining calcium and oxygen molecules find themselves in proximity to a dibasic calcium phosphate, and enter the compound to form tri-calcium phosphate, $Ca_3(PO_4)_2$, which has the high melting point.

The effect of sulphuric acid on not only calcium sulphate but upon the calcium phosphate is indicated by the fact that mixing sulfuric acid, lime, and phosphoric acid results in a calcium phosphate-calcium sulfate precipitate which has bonding strength.

The burned silica brick of this invention consist essentially of silica particles bonded together by tricalcium phosphate and may contain without substantial detriment to its refractory qualities a minor amount of alumina. Suitable bricks contain 90–99% $SiO_2$, 1–7% $Ca_3(PO_4)_2$ and 0–1% $Al_2O_3$. The bricks are substantially free of $CaSiO_3$, and preferably the $Ca_2P_2O_7$ is left in minor amount compared with the $Ca_3(PO_4)_2$ of the order of one mole to two moles. The silica is mostly present in the form of ganister particles and most of the weight is in particles that will not pass through a 50-mesh screen.

The calcium phosphate may be present in an amount above 7% by weight, but the more that is present the more melt is obtained at high temperatures with consequent decrease in ability to withstand loads at high temperatures. The alumina is preferably absent, but its presence in 1% or even higher is satisfactory because alumina forms a much higher melting eutectic with silica and calcium phosphate than it does with silica and lime or calcium silicate. The present bricks containing alumina thus have a great advantage over the ordinary silica bricks made with lime, since either the alumina must be removed from the lime silica brick with consequent increase in expense or the alumina can be left in with consequent decrease in refractoriness.

The primary bond in the fired silica brick of this invention is tricalcium phosphate, $Ca_3(PO_4)_2$. However, the bond may also contain some $Ca_2P_2O_7$. The presence of this compound can be avoided by adding lime, but this is not necessary as the dry strength of the brick is better with a small amount of $Ca_2P_2O_7$ such as .2% to 5% of the weight of the brick.

The proportion of calcium phosphate to silica may be varied widely. In making a fired phosphate bonded silica brick there is less need for green strength in the kiln so that the amount of calcium phosphate can be less than for the unfired brick where considerable green strength is needed for shipping. Thus, in the terms of the final bond of tricalcium phosphate, the fired brick will suitably contain from 1–7% of tricalcium phosphate, though more may be used.

In preparing the bricks, the bonding agent is generally first prepared by mixing together concentrated sulphuric acid, for example, 98% $H_2SO_4$, with phosphoric acid of, for example, 75% concentration and then lime or calcium hydroxide added to this mixture with stirring. In place of phosphoric acid, which may be any of the various phosphoric acids, there may be used any calcium phosphate. A reaction takes place and the final mortar before drying is a composition of putty-like consistency essentially of a calcium sulphate, dicalcium phosphate mixed with sulphric acid. The sulphuric acid acts as a solvent and ties up the lime as $CaSO_4$.

The mortar or putty-like calcium sulphate, calcium phosphate, sulphuric acid composition is mixed with granulated silica such as ganister, the mixture dry pressed into brick form and then dried at about 700° F. precipitate the sulphate and phosphate and remove the water from the mixture and produce a product bonded together with a composition of $CaSO_4$ and $CaHPO_4$. These materials have crystalline forms so similar to each other that X-ray analysis is unable to separate them so that the lime tends to react with the phosphate solution and not with the silica. Ordinarily, the temperature at which the bricks are dried is not carried below 550° F. After drying, the brick is then placed in a kiln at, for example, a temperature of 2400–2700° F. until the brick size expands and the silica is substantially all converted to tridymite and cristobalite. This usually requires from 24 to 48 hours. Also, at such high temperature the calcium sulphate is decomposed with the evolution of $SO_3$, and the bond then becomes mostly tricalcium phosphate with generally some $Ca_2P_2O_7$ when there is less than a 1–2 mixture of $CaSO_4$ to $CaHPO_4$ in the intermediate bond.

Generally the silica is used in the form of ganister in alpha quartz form. However, we may use granulated silica which has been previously converted to cristobalite form. Also, fused silica may be used.

The bonding agent may be first made and then mixed with granulated silica or the bonding agent may be produced in situ with the ganister.

Various types of silica can be bonded with our composition and light weight refractory bricks can be made using diatomaceous earth.

Obviously the invention is not limited to the details of the illustrative product and its method of manufacture, since these may be variously modified. However, it is not indispensable that all features of the invention be used conjointly since various features may be used to advantage in different combinations and sub-combinations.

Having thus described applicants' invention, what is claimed is:

1. The method of making a fired brick which comprises mixing granular silica in an amount of at least 90% by weight of the total mix with lime, sulphuric acid and a member of the group consisting of phosphoric acid, monobasic calcium phosphate and dibasic calcium phosphate, the amount of sulphuric acid being in excess of that required to form $CaSO_4$ and the calcium being present in not substantially greater amount than that required to combine with the phosphate containing substance to convert said substance to tricalcium phosphate, pressing the mixture into shape and drying at a temperature up to about 700° F., and then further heating to a temperature of between about 2400° F. and 2700° F. whereby the shaped article consists essentially of silica bonded together with tricalcium phosphate.

2. The method of making an unfired brick which comprises mixing granular silica in an amount of at least 90% by weight of the total mix with lime, sulphuric acid and a member of the group consisting of phosphoric acid, monobasic calcium phosphate and dibasic calcium phosphate, the amount of sulphuric acid being in excess of that required to form $CaSO_4$ and the calcium being present in not substantially greater amount than that required to combine with the phosphate containing substance to convert said substance to tricalcium phosphate, pressing the mixture into the shape of brick and drying at a temperature up to about 700° F.

References Cited in the file of this patent

UNITED STATES PATENTS

| | | |
|---|---|---|
| 958,084 | Breavley et al. | May 17, 1910 |
| 1,924,744 | Lux | Aug. 29, 1933 |
| 2,099,367 | Lefranc | Nov. 16, 1937 |
| 2,218,623 | Ricker | Oct. 22, 1940 |
| 2,618,530 | Gardner | Nov. 18, 1952 |

FOREIGN PATENTS

| | | |
|---|---|---|
| 599,517 | France | 1925 |